Jan. 20, 1959  E. L. LUCKETT  2,869,513
PORTABLE LIVESTOCK LOADING CHUTE
Filed Jan. 8. 1957  3 Sheets-Sheet 1
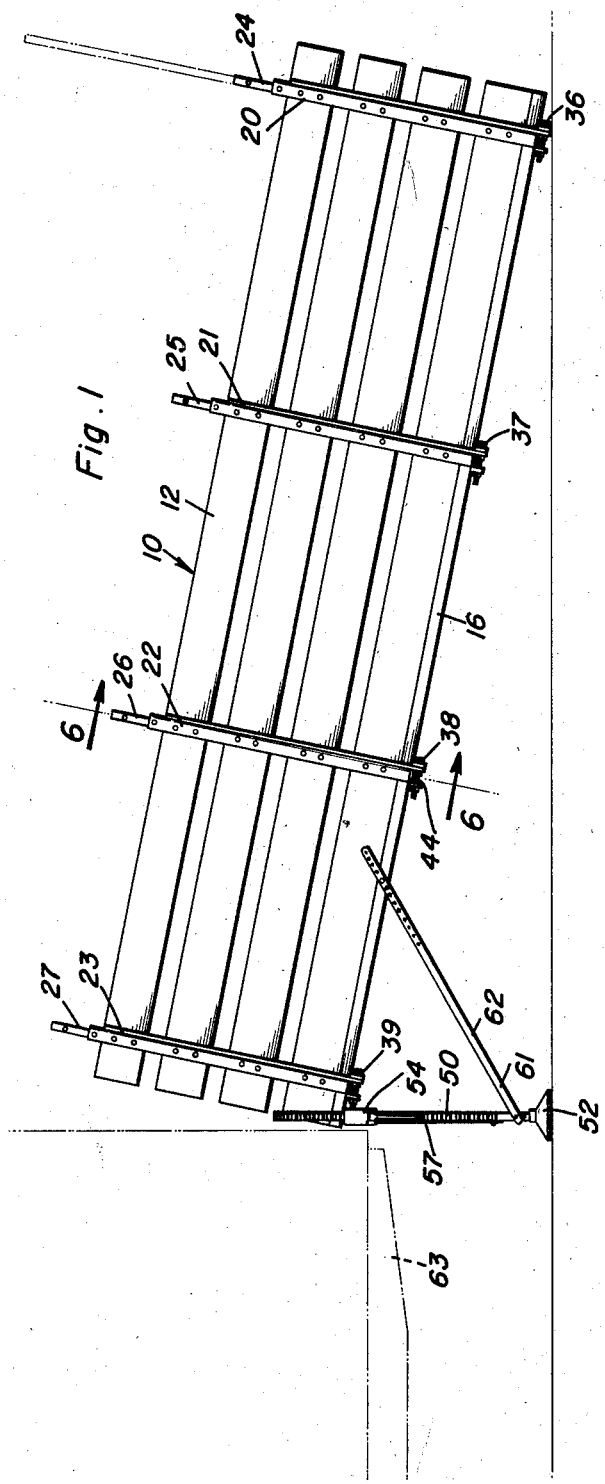
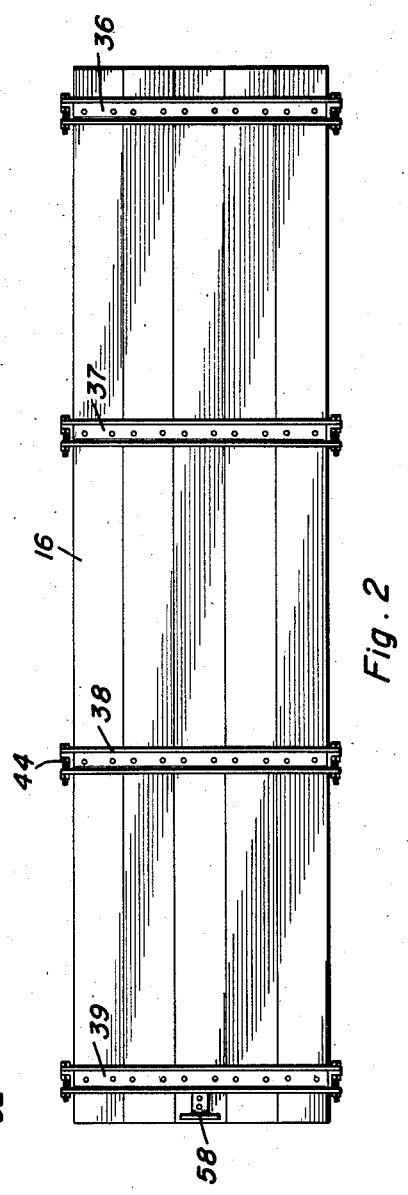
Embry L. Luckett
INVENTOR.
BY
Attorneys Jan. 20, 1959  E. L. LUCKETT  2,869,513
PORTABLE LIVESTOCK LOADING CHUTE
Filed Jan. 8, 1957  3 Sheets-Sheet 2

Embry L. Luckett
INVENTOR.

BY *Clarence A. O'Brien*
*and Harvey B. Jacobson*
Attorneys

Jan. 20, 1959     E. L. LUCKETT     2,869,513
PORTABLE LIVESTOCK LOADING CHUTE
Filed Jan. 8, 1957     3 Sheets-Sheet 3
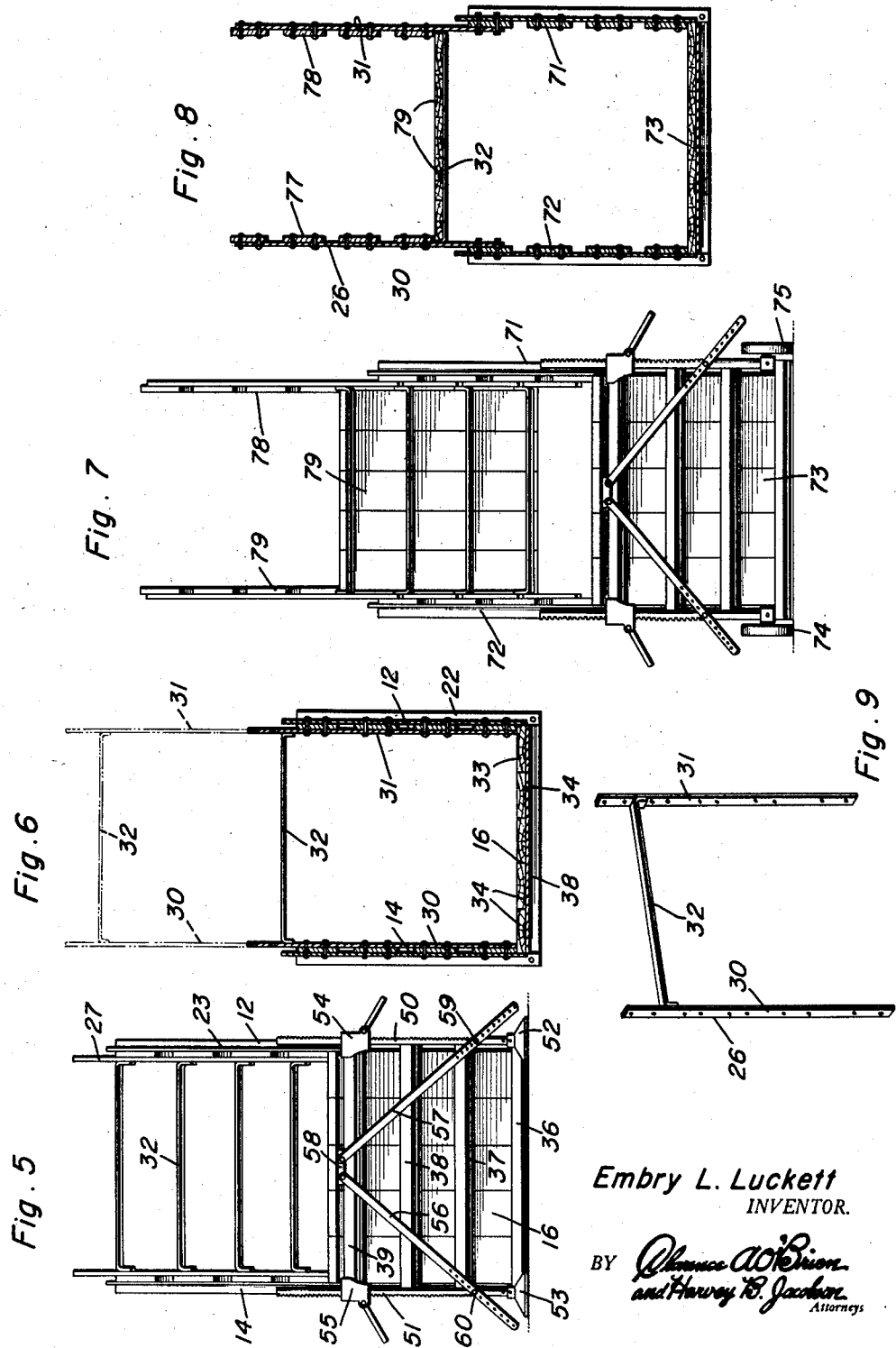
Embry L. Luckett
INVENTOR.

United States Patent Office 2,869,513
Patented Jan. 20, 1959

2,869,513

PORTABLE LIVESTOCK LOADING CHUTE

Embry L. Luckett, Wichita Falls, Tex.

Application January 8, 1957, Serial No. 633,027

4 Claims. (Cl. 119—82)

This invention relates to livestock loading chutes and more particularly to a portable livestock loading chute.

An object of the present invention is to provide a livestock chute which is of improved construction, which is portable and which is equally useful as a single or double deck chute for loading and unloading vehicles of any type or to fulfill any other need depending on the prerogative of the user.

A further object of the invention is to provide a livestock chute which may be constructed at a reasonable cost and which is fitted with one or more jacks at one end in order to elevate that end for ease of tilting the chute, the jack having either a platform type support or a wheeled support and having means connected therewith which function as safety stops to prevent the elevated end of the chute from inadvertently falling.

Another object of the invention is to provide a livestock chute which is of improved mechanical construction and which is so designed as to enable the chute to be provided with a second chute for simultaneous loading or unloading of livestock.

A further object of the invention is to provide a livestock chute which is of knockdown construction so that after it is used it may be very quickly and easily unassembled to facilitate the transportation thereof.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an elevational view of a livestock chute constructed in accordance with the principles of the invention and showing the same in a loading or unloading position;

Figure 2 is a bottom view of the livestock chute in Figure 1 with the jacks at the forward end omitted;

Figure 5 is an elevational front view of the chute in Figure 1;

Figure 6 is a sectional view taken on the line 6—6 of Figure 1;

Figure 7 is an elevational view of the chute in Figure 3;

Figure 8 is a transverse sectional view taken on the line 8—8 of Figure 3; and

Figure 9 is a perspective view of a frame which constitutes a part of the invention.

Figures 3, 4:
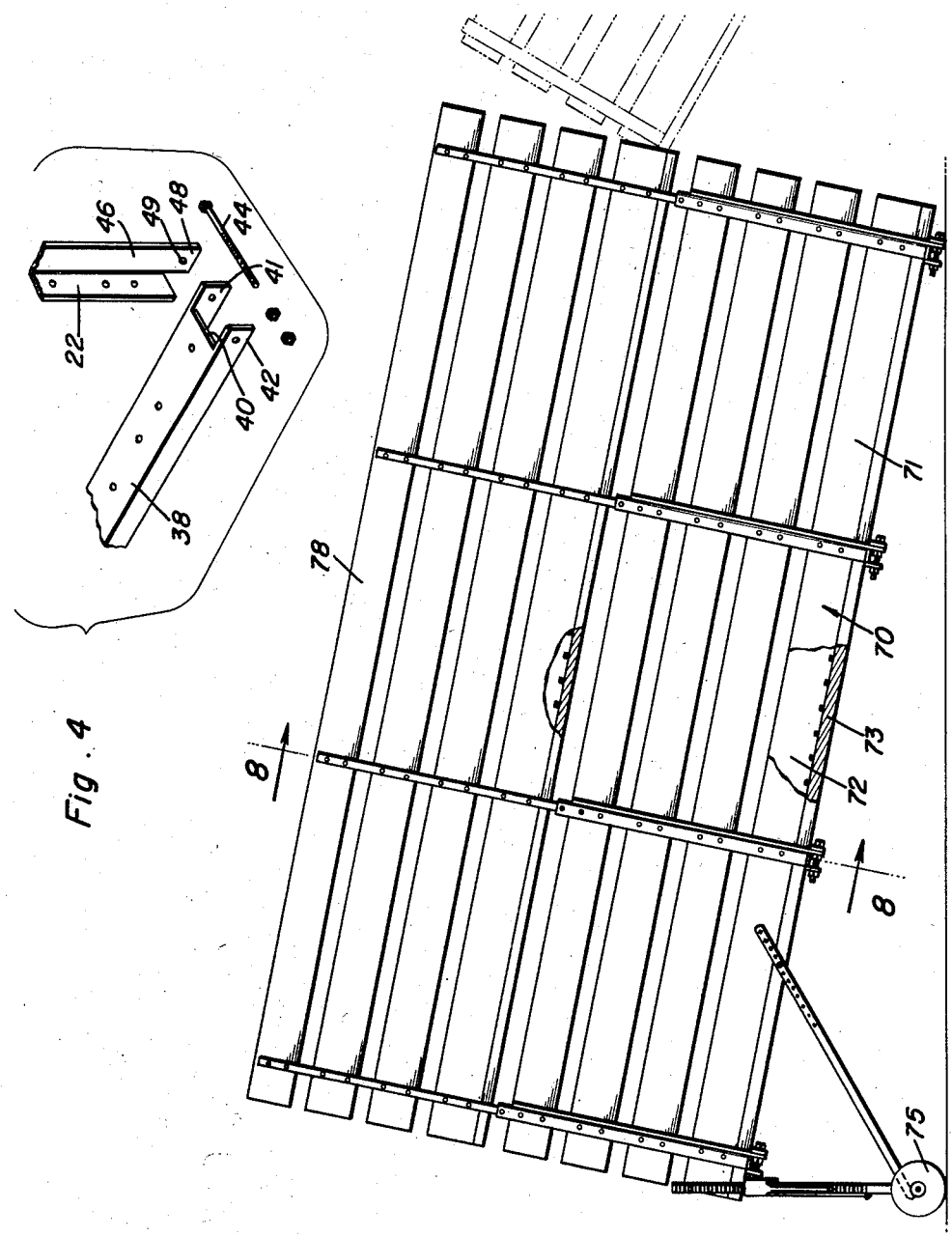
Figure 3 is an elevational side view of a modification.
Figure 4 is an exploded perspective view of the means for attaching the sides to the botttom of the chutes.

Reference is now made to the accompanying drawings wherein Figures 1 and 2 show livestock chute 10 exemplifying the principles of the invention. The livestock chute consists of a pair of sides 12 and 14 and a bottom 16 connected to the sides. Although any materials of construction may be used it is preferred that the sides of the chute be made of lightweight material, as lumber, thin steel or aluminum in strips and connected together by a plurality of posts. The strips or planks in the case of lumber, for sides 12 are connected together by four angle iron members 20, 21, 22 and 23 respectively with one flange of each angle iron being riveted or otherwise secured to the four spaced strips (Figure 1). There are four frame members 24, 25, 26 and 27 attached to the sides 12 and 14 and backing the members 20, 21, 22 and 23. Frame 26 is typical of all of the frames and is shown in Figure 9. It is made of two sides 30 and 31 connected by a cross member 32 so that the frame 26 has an approximate U-shaped side having a number of holes through which rivets or other fasteners may pass and having upwardly protruding parts which extend above the upper edges of the members 20, 21, 22 and 23.

Bottom 16 is made of heavy planks 34 and has conventional transverse cleats to facilitate the animals walking thereon. Transverse support members 36, 37, 38 and 39 are riveted and otherwise secured to the planks 34 and each support member is a downwardly opening channel. The ends of each channel are especially constructed to cooperate with bolts to form means for attaching the sides to the bottom 16. The web of channel 38 is notched as at 40 (Figure 4) leaving the sides protruding to define ears 41 and 42 that have aligned apertures therein to accommodate the bolt 44. One flange 46 of the member 22 is extended to form an ear 48 and it has an aperture 49 in it adapted to be aligned with the apertures and ears 41 and 42 so that the bolt 44 may pass through it. When the nuts are applied onto the bolt 44 a strong but separable connection is made between the two sides and the bottom of the chute.

Where a double-deck chute is desired longer frames 24, 25, 26 and 27 (see Figure 6) may be used and additional cross members identical to those at 32, connected to the upper ends. Then, the cross members 32 support planks that constitutes a floor to make a second, upper deck. Other alternatives for the second or upper deck are to be described subsequently.

Attention is invited principally to Figures 1 and 5 where the means for elevating one end of the chute are shown in detail. These means comprise two jacks 50 and 51 that have platform type bases 52 and 53 and that are of the mechanical type. Other types of jacks may be substituted, for example, hydraulic jacks. The movable parts 54 and 55 of jacks 50 and 51 extend under the bottom 16 of the chute and when the jacks are raised, that end of the chute is also raised. Means to prevent the chute from inadvertently falling or sliding off the jacks are operatively connected to both jacks and to the chute. This means comprise two safety arms 56 and 57 which are pivoted on a mounting bracket 58 on the undersurface of the bottom 16 at one end thereof and at approximately the centerline thereof. The opposite ends of the safety arms 56 and 57 have a number of holes in which pins 59 and 60 are insertable, these pins being also insertable in the standards of the jacks 50 and 51 and forming diagonal braces. Identical side braces 61 and 62 are pivoted to the lower extremities of the jacks and separably connected in a selected hole in the groups of holes at the ends of the arms to side edges of the bottom 16 of the chute. As shown in Figure 1 the chute may be placed alongside of a vehicle 63 which represents any type, such as rail, or highway traveling cars.

Referring to Figure 3 there is illustrated a chute 70 which is constructed in the same general way as the chute 10 insofar as the sides 71 and 72 and the bottom 73 are concerned. That is, the sides are separably connected to the bottom in a manner similar to the detail of Figure 4. The sides are constructed of planks or metallic strips held spaced apart and parallel by frame members and the bottom 73 is constructed in precisely the same way as the bottom 16 of Fig. 1.

The distinction lies in the pair of wheels 75 and 74 on the lower extremities of the jack instead of the platform type bases 52 and 53 and also some structural details seen best in Figure 8. The inner frames do not extend all the way down to the bottom 73 of the chute, although this could be accomplished by using the frames as shown in Figure 9 and inverting them in Figure 8. This condition is shown in phantom line in Figure 6. When used as in Figure 8 the frames such as those shown at 26, 27, 25 and 24 (Fig. 1) have planks made of wood, thin metal or any other material, attached thereto in order to form sides 77 and 78, while the cross members as at 32 have floor boards or planks 79 thereon in order to form the bottom of the upper chute. The bottom of the upper chute has conventional cleats on it to facilitate the animals moving thereover. If found desirable the cross members 32 in Figure 8 may be bolted instead of welded or otherwise permanently joined to the sides 30 and 31 in order to facilitate the knocking down of the chute.

The raising and lowering of one end of the chute in Figure 3 is achieved in exactly the same way as the raising and lowering of the chute 10. All other details of function are identical.

The upper chute of Figure 8 and Figure 3 may be used independently of the lower chute while the lower chute may be used independently of the upper chute or both of them may be used simultaneously.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a livestock chute, a pair of sides, a bottom, said sides having frame members with ends protruding below the lower edges of said sides, support members extending transversely across said bottom and having ears at the extremities thereof, and means separably securing said ears to the lower extremities of said members in order to separably connect said members to said bottom, frames, each frame having sides and a cross member rigidly fixed thereto with said sides inserted between the sides of said chute and attached thereto, and said cross members of the frames constituting structural supports for said chute, a floor for an upper chute mounted on said cross members, selective height adjusting means connected to one end of said bottom of said chute for elevating said end of said chute, and a safety device operatively connected between said elevating means and said chute in order to hold said chute in the selected elevated position.

2. The combination of claim 1 wherein said safety means comprise arms which are connected respectively to said elevating means and said chute.

3. In a livestock chute, a pair of sides, a bottom, said sides having frame members with ends protruding below the lower edges of said sides, support members extending transversely across said bottom and having ears at the extremities thereof, and means separably securing said ears to the lower extremities of said members in order to separably connect said members to said bottom, frames, each frame having sides and a cross member with said sides inserted between the sides of said chute and attached thereto, said cross members constituting structural supports for said chute, a floor for an upper chute mounted on said cross members, the sides of said frame projecting above the sides of said chute, said cross members being disposed in substantial alignment with the upper edges of the sides of said chute.

4. In a livestock chute, a pair of sides, a bottom, said sides having frame members with ends protruding below the lower edges of said sides, support members extending transversely across said bottom and having ears at the extremities thereof, and means separably securing said ears to the lower extremities of said members in order to separably connect said members to said bottom, frames, each frame having sides and a cross member with said sides inserted between the sides of said chute and attached thereto, said cross members constituting structural supports for said chute and adapted to support a floor for an upper chute, the sides of said frame projecting above the sides of said chute, said cross members being disposed in substantial alignment with the upper edges of the sides of said chute, each frame having a second cross member disposed in spaced, parallel relation to said frame member, a floor on said frame member whereby a double deck chute is formed.

References Cited in the file of this patent

UNITED STATES PATENTS

| | | |
|---|---|---|
| 604,834 | Myers | May 31, 1898 |
| 753,833 | Copley | Mar. 1, 1904 |
| 903,157 | Allen | Nov. 10, 1908 |
| 1,512,756 | Gharst et al. | Oct. 21, 1924 |
| 2,754,802 | Patterson | July 17, 1956 |
| 2,779,489 | Boom | Jan. 29, 1957 |